United States Patent [19]

Connell et al.

[11] 3,881,060

[45] Apr. 29, 1975

[54] EMERGENCY REPORTING SYSTEM

[75] Inventors: Joseph Bernard Connell, Rumson; Alfred Zarouni, Middletown, both of N.J.

[73] Assignee: Bell Telephone Laboratories, Incorporated, Murray Hill, N.J.

[22] Filed: June 4, 1973

[21] Appl. No.: 366,643

[52] U.S. Cl. .............................. 179/5.5; 179/18 BA

[51] Int. Cl. .............................. H04m 3/44

[58] Field of Search ........ 179/5 R, 5 P, 18 DA, 5.5, 179/18 B, 18 BA, 18 BE, 18 FH

[56] References Cited

UNITED STATES PATENTS

| | | | |
|---|---|---|---|
| 3,496,303 | 2/1970 | Pharis | 179/18 B |
| 3,692,946 | 9/1972 | Budrys et al. | 179/18 BA |

*Primary Examiner*—Kathleen H. Claffy
*Assistant Examiner*—Tommy P. Chin
*Attorney, Agent, or Firm*—D. A. Marshall

[57] ABSTRACT

An emergency reporting system for selectively interconnecting ones of a plurality of telephone stations, each assigned a directory number, through the telephone communication switching network to designated emergency service centers. The system is arranged so that a calling telephone station dialing a universal emergency reporting number is connected from an originating telephone central office over a dedicated trunk facility to a tandem switching office. The tandem switching office receives and translates the directory number of the calling telephone station into a routing code utilized for directing the tandem switching office to interconnect the calling telephone station with an emergency service center specifically designated to serve the calling telephone station.

9 Claims, 6 Drawing Figures

FIG. 4

ROUTE TRANSLATOR
TELEPHONE CENTRAL OFFICE 1

| DIALED STA. NO. |
| --- |
| 911 |

HEAD TABLE

| CODE | ROUTE INDEX | | |
| --- | --- | --- | --- |
| | 1ST CHOICE | ALTERNATE | SPECIAL TREATMENT |
| 211 | TRK GRP 3 | TRK GRP 4 | NO OUT PULSING |
| 911 | TRK GRP 10 | TRK GRP 20 | OUT PULSE 7 DIGITS OF CALLING STA. NO. |
| 411 | TRK GRP 4 | TRK GRP 3 | NO OUT PULSING |

SUB TRANSLATOR

| TRK. GRP. | TRUNK CLASS | | |
| --- | --- | --- | --- |
| | TYPE | LOC. | EQUIPMENT |
| 10 | MF | TL102 | MF DIGIT TRANSMITTER |
| 20 | DP | TL102 | DP DIGIT TRANSMITTER |
| 3 | MAN | TL102 | NO TRANSMITTER REQ'D |

LINE NUMBER TRANSLATOR

INPUT

| NET. | LL | BAY | CONC | SN | LEVEL |
| --- | --- | --- | --- | --- | --- |
| 15 | 101 | 4 | 3 | 1 | 03 |

HEAD TABLE

| LINE EQUIP. NO. | CLASS OF SRV. | DIRECTORY NO. | TYPE OF PULSE REC'D |
| --- | --- | --- | --- |
| 14 101 3 14 10 | 08 | 752-9971 | DIAL PULSE |
| 15 101 2 73 15 | 21 | 856-9972 | DIAL PULSE |
| 15 101 4 31 03 | 21 | 631-9970 | DIAL PULSE |

ROUTE TRANSLATOR
TANDEM SWITCHING OFFICE 2

INPUT

| TRK. CLASS |
| --- |
| 42 |

INPUT

| CALLING STA. NO. |
| --- |
| 631-9970 |

HEAD TABLE

| CODE | ROUTE INDEX | | |
| --- | --- | --- | --- |
| | 1ST CHOICE | ALTERNATE | SPECIAL TREATMENT |
| 42 752-9971 | TRK GRP 21 | OPER | NO OUT PULSING |
| 42 631-9970 | TRK GRP 20 | OPER | OUT PULSE 7 DIGITS OF CALLING STA. NO. |
| 42 856-9972 | TRK GRP 22 | OPER | OUT PULSE LAST 4 DIGITS OF CALLING STA. NO. |

SUB TRANSLATOR

| TRK. GRP. | TRUNK CLASS | | |
| --- | --- | --- | --- |
| | TYPE | LOC. | EQUIPMENT |
| 20 | MF | TL202 | MF DIGIT TRANSMITTER |
| 22 | DP | TL202 | DP DIGIT TRANSMITTER |
| 21 | MAN | TL202 | NO TRANSMITTER REQ'D |
| OPER | MAN | TL202 | NO TRANSMITTER REQ'D |

EMERGENCY REPORTING SYSTEM

BACKGROUND OF THE INVENTION

1. Field of the Invention

This invention concerns communication systems. In particular, it relates to a communication switching network wherein emergency calls are selectively routed to emergency service centers designated to serve predetermined stations of the switching network.

2. Description of the Prior Art

In heavy and relatively densely populated areas there are emergency service centers, such as police, ambulance, and fire departments, that have been organized to dispatch aid in response to public cries for assistance. Each of these emergency service centers in the past have been assigned ordinary telephone directory numbers that function to identify the location of an emergency service center and the type of emergency service provided by the center. For a given metropolitan area there may be numerous numbers of emergency service centers each providing a particular type of emergency service for a designated part of the area. In these situations it becomes literally impossible to inform the public of all the available emergency service centers in the metropolitan area and of the seldom used telephone directory numbers assigned to each center.

It has been proposed that wherever practical a universal telephone directory number be established within metropolitan areas and eventually over the entire United States, identifying emergency service centers to which public requests for assistance can be directed. Under this universal telephone directory number concept everyone requesting assistance regardless of the nature of the emergency would dial a three-digit telephone directory number, such as 911. The call would be routed from an originating telephone central office serving the calling party over the telephone communication switching network to a community emergency service center manned by a cadre of professional attendants able to provide the type of assistance required by the calling party. Due to the confusing and conflicting complexity of governmental agencies located in the various communities comprising a metropolitan area, a question arises as to whether the various agencies established to serve the public can assume the burden of cooperating among themselves to provide assistance to the public in emergencies. For example, the governmental agencies of one community may be able to provide an emergency service center for the community but may not be able, or willing, to participate in providing emergency service for nearby communities.

A typical telephone central office of the telephone communication switching network serves a plurality of telephone stations located in a number of communities each having an emergency service center designated for providing emergency assistance for the citizens of the community. In accordance with the proposed universal telephone directory number emergency reporting system, it is highly desirable that a community citizen requiring emergency assistance dial the universal telephone directory number 911 and thereby be automatically connected through the telephone communication switching network with the emergency service center designated to serve the community. The telephone communication switching network is presently arranged for establishing connections to called telephone stations on the basis of the dialed telephone directory number assigned to the called telephone station and the equipment location of the calling telephone station within the serving telephone central office. Thus, the dialed universal telephone directory number 911 does not identify the one emergency service center designated to serve the calling citizen from other community emergency service centers, each of which are also assigned the universal telephone directory number 911.

Accordingly, a need exists in the art for a communication switching network arranged for interconnecting a station dialing a universal telephone directory number with an emergency service center specifically designated to provide emergency assistance to the calling station. A need also exists for an arrangement for directing the switching offices of the telephone communication switching network to selectively establish connections to ones of a number of emergency service centers in response to a universal telephone directory number dialed from telephone stations by parties requiring emergency assistance.

SUMMARY OF THE INVENTION

In the exemplary embodiment of the invention switching offices of a communication network are arranged to interconnect calling stations dialing a universal directory number with ones of a plurality of emergency service centers in accordance with the directory numbers assigned the calling stations. Emergency service centers, each assigned a universal number, are designated to provide emergency assistance for predetermined ones of a number of stations served by a communication switching network. Switching offices of the communication switching network respond to the universal number generated by calling stations by identifying the calling stations and registering the unique directory number assigned to each identified station. The switching offices respond to the registered calling station directory numbers by selectively interconnecting the calling stations with ones of the emergency service centers in accordance with the registered directory numbers normally assigned the calling stations.

In accordance with one feature of the invention, a calling telephone station dialing a universal number, such as 911, is routed from a serving telephone central office over a trunk facility incoming to a tandem switchng office. The tandem switching office receives and translates the directory number assigned the calling telephone station into routing information utilized to direct the common control of the tandem switching office to interconnect the incoming trunk facility with an outgoing trunk facility terminated in an emergency service center designated to serve the calling telephone station.

Another feature of the invention is the provision of arrangements for enabling the identity of a calling telephone station dialing the universal number 911 to be transmitted over the telephone communication switching network to one of a plurality of emergency service centers specifically designated to serve the calling telephone station.

In accordance with still another feature of the invention is the provision of apparatus for use in the switching offices of the telephone direct distance dialing switching network to translate the directory number assigned a calling telephone station having dialed the universal number 911 into routing instructions utilized to direct the common control of a switching office to interconnect the calling telephone station with an emergency service center specifically designated to provide emergency assistance to the calling telephone station.

BRIEF DESCRIPTION OF THE DRAWING

The foregoing as well as other objects, features, and advantages of the invention will be more apparent from a description of the drawing, in which:

FIG. 4 shows various tables utilized by the stored program control data processor in controlling the operation of the communication switching network set forth in FIGS. 2A and 2B.

GENERAL DESCRIPTION

A. System Organization

Figure 1:
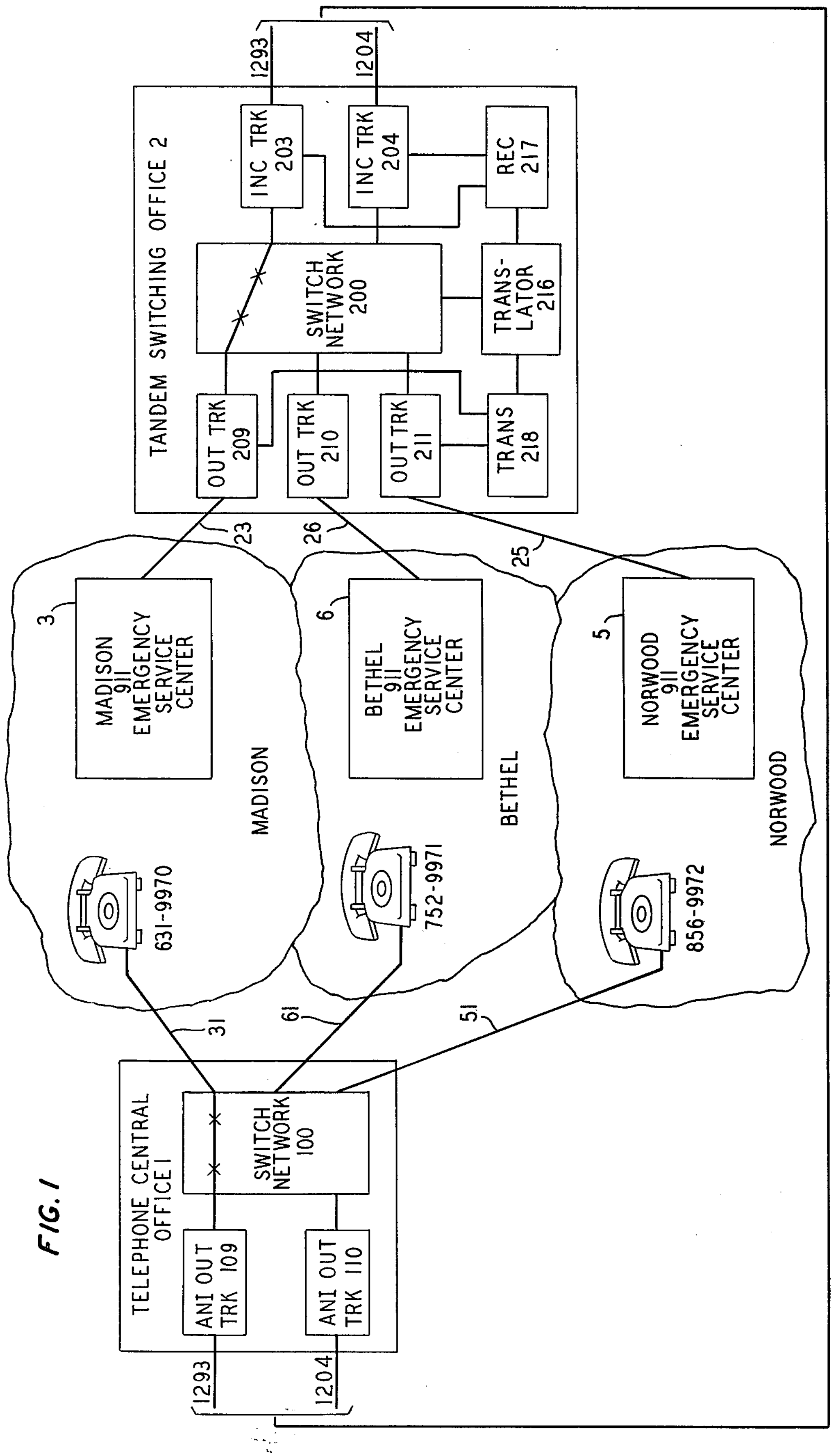
FIG. 1 illustrates a communication switching network setting forth the interrelationship of the various components of an illustrative embodiment of the invention.

Referring now to FIG. 1 of the drawing, it is intended that telephone central office 1, set forth therein, serve telephone stations located in three communities herein identified as Madison, Bethel, and Norwood. It is further intended that each community has provided an emergency service center, identified by the universal telephone number 911, to respond to calls for emergency assistance generated by citizens of the community. Each of the community emergency service centers is connected by trunk circuits to tandem switching office 2 of the telephone communication switching, or direct distance dialing, network. Tandem switching office 2 is coupled by other trunk circuits to telephone central offices, such as telephone central office 1, and is arranged to interconnect incoming trunk circuits from one telephone central office with outgoing trunk circuits extending to emergency service centers and other telephone central and tandem switching offices.

B. Request for Assistance

A citizen of a community, for example, Madison, initiates a request for emergency assistance by removing the handset of a telephone station, such as telephone station 631–9970. Upon receipt of dial tone, the citizen, herein referred to as the calling party, dials the universal telephone number 911. Telephone central office 1 receives the dialed digits 911 over telephone line 31 and establishes a connection through switched network 100 with ANI outgoing trunk 109. Seizure of ANI outgoing trunk 109 transmits a signal over trunk facility 1293 to incoming trunk 203 of tandem switching office 2. Receipt of the seizure signal by incoming trunk 203 enables tandem switching office 2 to establish a connection between incoming trunk 203 and receiver 217.

Telephone central office 1 identifies directory number 631–9970 assigned the calling Madison telephone station and transmits the number digits thereof over ANI outgoing trunk 109, trunk facility 1293, and incoming trunk 203 to receiver 217. Translator 216 translates the received directory number 631–9970 of the Madison calling telephone station into the identity and location of an outgoing trunk group terminated in Madison 911 emergency service center 3. An idle trunk 209 is then selected in this trunk group. Tandem switching office 2 then establishes a connection from incoming trunk 203 through switched network 200 with outgoing trunk 209 in order that the calling party located at telephone station 631–9970 may request emergency assistance from Madison 911 emergency service center 3. If required, transmitter 218 is connected to outgoing trunk 209 and the digits 631–9970 of the calling telephone station are transmitted from the outgoing trunk 209 over trunk facility 23 for the purpose of enabling Madison 911 emergency service center 3 to identify the calling telephone station.

If the calling party had been located at telephone station 752–9971, the directory number digits 752–9971 identifying the location of the calling telephone station would be received by tandem switching office 2 and translated into the identity and location of outgoing trunk 210. Thus, a connection would be established from telephone station 752–9971 over outgoing trunk 210 and trunk facility 26 to Bethel 911 emergency service center 6. Had the telephone directory number received by tandem switching office 2 been 856–9972, translator 216 would translate the digits 856–9972 into the location and identity of outgoing trunk 211 in order that a communication path could be established between telephone station 856–9972 and Norwood 911 emergency service center 5.

In summary, telephone stations having dialed the universal number 911 are interconnected by offices of the telephone communication switching network with designated emergency service centers in accordance with the directory numbers assigned calling stations.

Detailed Description

A. General

Figures 2A, 2C:
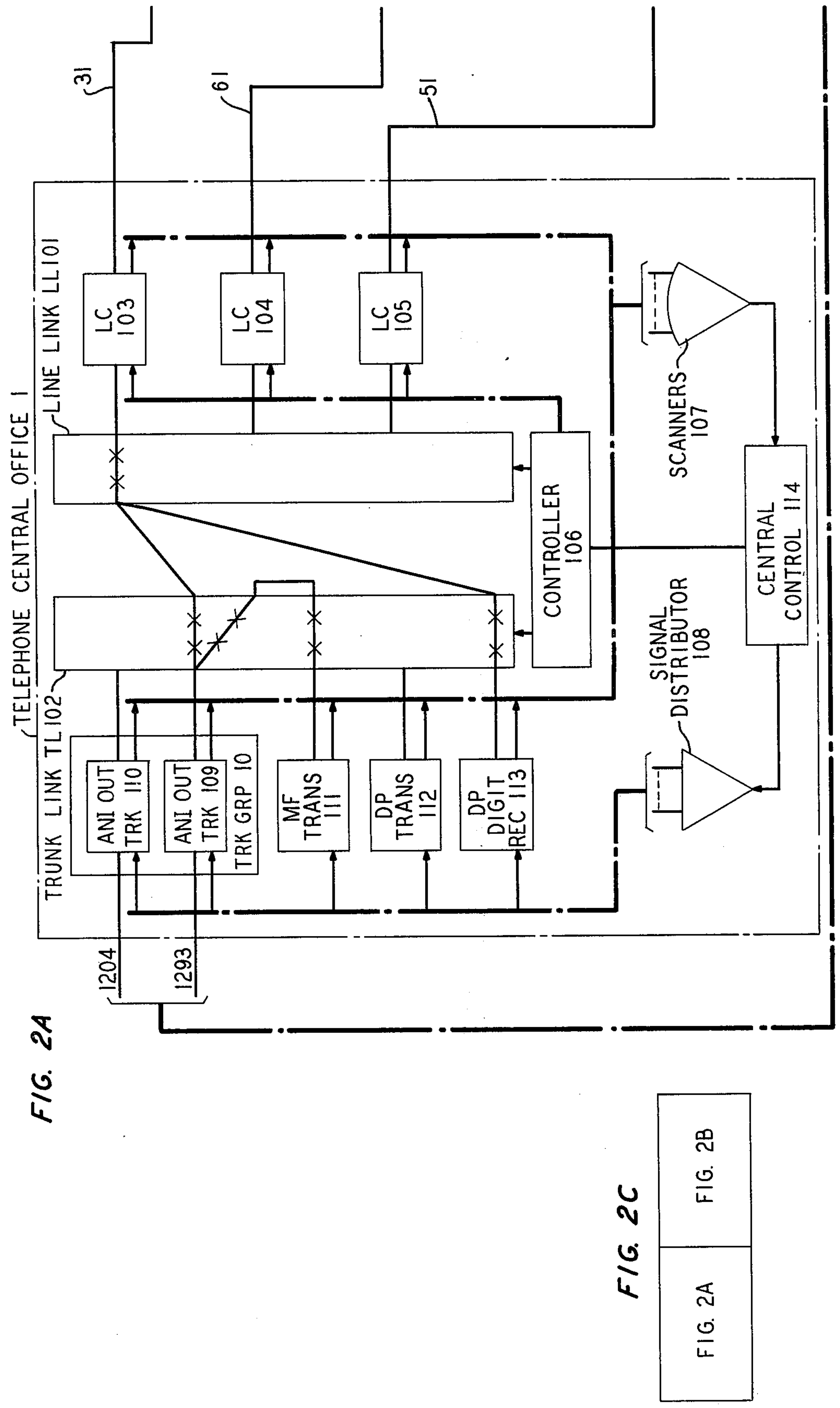
FIGS. 2A and 2B, when arranged in accordance with FIG. 2C, set forth the pertinent portions of the control circuitry utilized by the communication switching network to process emergency assistance call requests.
Figure 2B:
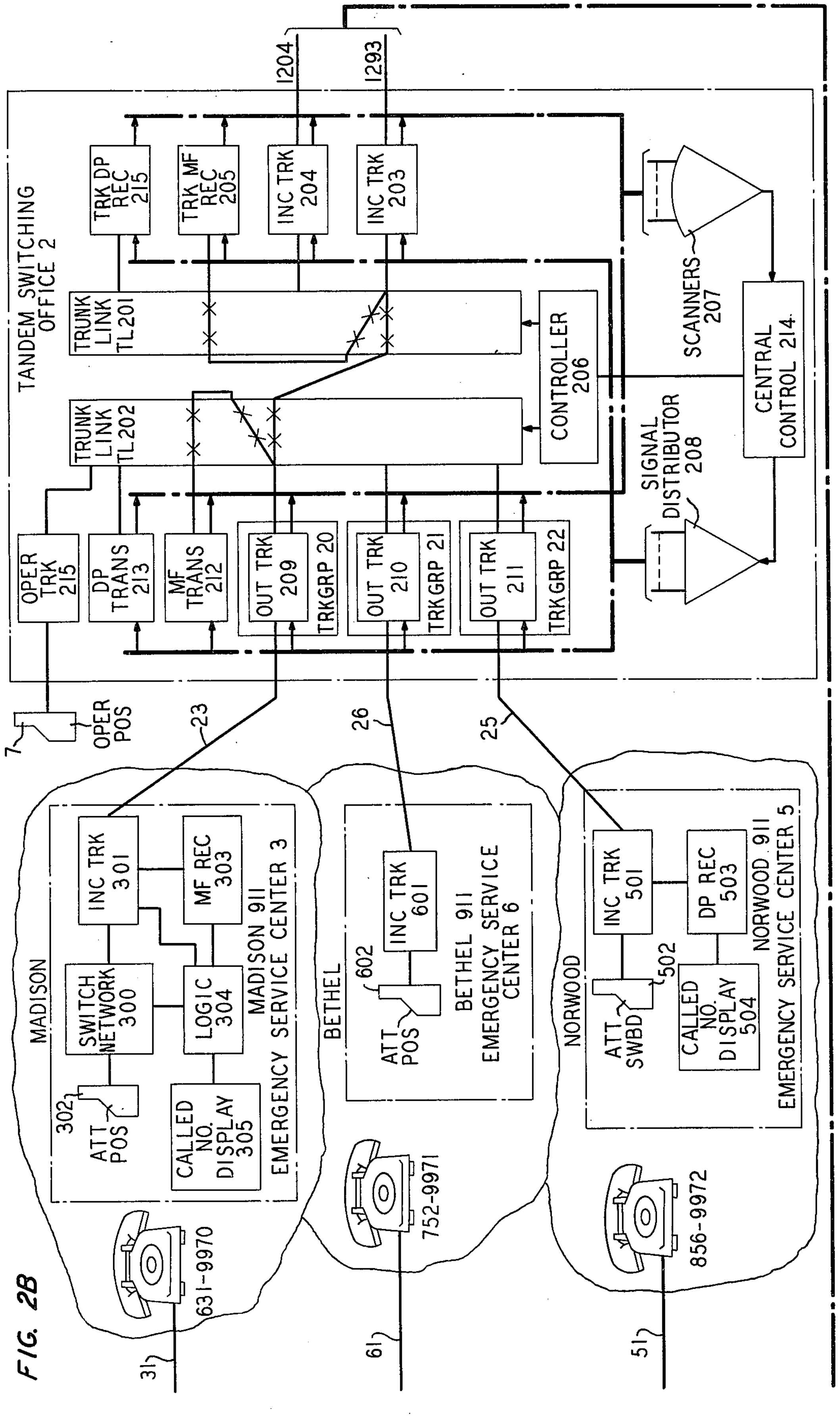

Telephone central office 1, FIGS. 2A and 2B, is utilized to establish and supervise calls in an automatic manner between telephone stations of the telephone communication switching network. It is intended that for the purpose of the present embodiment telephone central office 1 be a conventional telephone switching system of the fundamental type disclosed in detail in the entirety of the September 1964 issue of the Bell System Technical Journal. It is to be noted that the present invention is not limited to use with a telephone switching system of this type but may be advantageously utilized with other types of switching systems including electro-mechanical switching systems such as crossbar switching systems.

The telephone stations located in the communities of Madison, Bethel, and Norwood, and herein represented as telephone stations 631–9970, 752–9971, 856–9972, are connected by line facilities 31, 61, 51 to line circuits 103, 104, 105, respectively, of serving telephone central office 1. Line link LL101 terminates appearances of telephone line circuits 103, 104, 105 while trunk link TL102 terminates appearances of dial pulse digit receivers 113, multifrequency (MF) and dial pulse (DP) transmitters 111, 112, and various types of trunks, such as ANI outgoing trunks 109, 110 of trunk group 10. Basically, line link LL101 and trunk link TL102 form a switching network of the type described by A. Feiner and W. S. Haywood in an article entitled "No. 1 ESS Switching Network Plan" at page 2193 of the aforementioned Bell System Technical Journal. Line and trunk links LL101, TL102 comprise a plurality of line switches and trunk switches that function to interconnect line circuits, dial pulse digit receivers, MF and DP transmitters, and trunks under the direction of controller 106. In addition, various service circuits, such as tone sources, signaling detectors, ringing sources, and other miscellaneous circuits, none of which are shown, are provided to furnish features normally required in handling telephone calls.

All information processing required for operation of telephone central office 1 is handled by central control 114, signal distributor 108, and scanners 107. Central control 114 includes memory apparatus containing line and trunk translation data and the operating programs required by telephone central office 1 to process the serving of call requests. In addition, the memory apparatus is utilized to store temporary information, such as the digits dialed by telephone stations 631–9970, 752–9971, 856–9972, the idle states of lines and trunks, and other information required to process calls. Central control 114 is the basic supervision mechanism for telephone central office 1. In its simplest form, central control 114 transmits an address to memory apparatus and receives a corresponding program instruction to receive information from the memory apparatus and scanners 107. Central control 114 then performs logical operations on the received information and generates control information to be transmitted to the memory apparatus and signal distributor 108.

Input information to central control 114 is provided by scanners 107, which are connected to various points in telephone central office 1 to detect service requests and supervise the calls in process. Scanners 107, under the direction of central control 114, sample or scan lines, trunks, and various diagnostic points at discrete intervals of time. Detected information, such as service requests, dialed digits, and other control information, is transmitted by scanners 107 to central control 114 which, in turn, records the detected information in memory apparatus for subsequent use in processing calls.

Signal distributor 108 is connected to various points in telephone central office 1 where it is necessary that central control 114 be provided with expedient means to operate and release apparatus in trunks, dial pulse digit receivers, MF and DP transmitters, and various service control circuits. As will be described hereinafter, central control 114 addresses signal distributor 108 to transmit control information to operate and release devices in accordance with the stored program instructions of central control 114.

Tandem switching office 2 is a conventional telephone switching system of the type set forth in the aforementioned September 1964 issue of the Bell System Technical Journal and is arranged to perform tandem switching functions by interconnecting incoming trunks with outgoing trunks. Trunks incoming from telephone central offices, such as incoming trunks 203, 204, in combination with trunk MF and DP receivers 205, 215, have appearances terminated on trunk link TL201. Trunks outgoing to telephone central offices, operator positions, and community 911 emergency service centers, such as outgoing trunks 209, 210, 211, along with MF and DP transmitters 212, 213, have appearances connected to trunk link TL202. Controller 206, in accordance with instructions supplied by central control 214, enables trunk switches of the switching network comprising trunk links TL201, TL202 to selectively interconnect ones of the incoming trunks with ones of the outgoing trunks. All information processing required for the operation of tandem switching office 2 is handled by central control 214, signal distributor 208, and scanners 207 which are similar in construction to and perform in the same manner as central control 114, signal distributor 108, and scanners 107 of telephone central office 1.

The community 911 emergency service centers, set forth in the present embodiment, are each assumed to be equipped with a plurality of incoming trunks, such as incoming trunks 301, 601, 501, that are connected by trunk facilities 23, 26, 25 with outgoing trunks 209, 210 211 of tandem switching office 2. The incoming trunks of Madison 911 emergency service center 3 have appearances on switch network 300 that are connected under control of logic circuit 304 with attendant position 302. In addition, information received by incoming trunk 301 is recorded by MF receiver 303 and visually displayed at attendant position 302 on call number display 305. Norwood 911 emergency service center 5 is arranged so that incoming trunk 501 is terminated on attendant switchboard 502 and that incoming information is received by DP receiver 503 and visually displayed to a switchboard attendant by call number display 504. Bethel 911 emergency service center 6 has incoming trunk 601 terminated at attendant switchboard 602 and is not intended to automatically identify the calling telephone station.

B. Central Control

Figure 3:
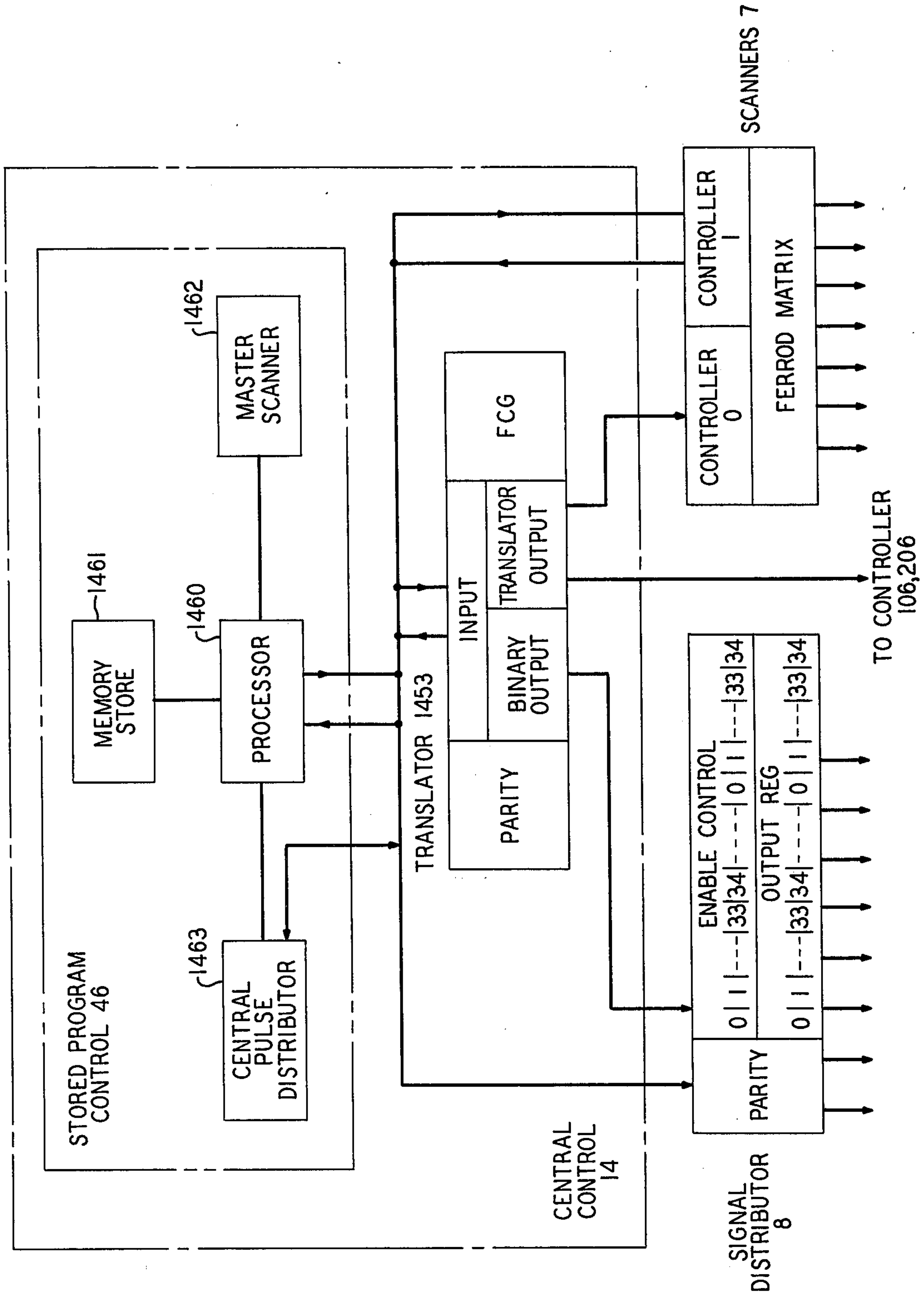
FIG. 3 depicts a stored program control data processor utilized to process call requests for emergency assistance.

Telephone central office 1 and tandem switching office 2 are each controlled by central controls 114, 214, scanners 107, 207, and signal distributors 108, 208 herein represented by central control 14, scanners 7, and signal distributor 8 set forth in FIG. 3 of the drawing. Stored program control system 46, a part of central control 14, is a word-organized electronic data processing system employing an electrically alterable memory for storing both program and call processing data. Many well-known general purpose computers can execute the functions performed by the stored program control system referred to herein. Therefore, a detailed description need not be given for a full understanding of the invention. Instead, certain parameters of stored program control system 46 will be described generally to give an appreciation of how a typical data processor would be employed in the embodiment of the invention. It is to be understood, however, that the invention is not limited to the data processor being described and that other data processors can be employed in the system without departing from the spirit and scope of the invention.

While stored program control system 46 is a high speed machine capable of performing many operations within a short interval of time, it must function with the slower operating units, such as trunks, line circuits, pulse transmitters and receivers, and serve them on a time-shared basis. In other words, it must quickly respond to service requests from other equipment units in order that the processing of telephone station calls will not be slowed down to seriously degrade the quality of telephone service.

Stored program control system 46 can, as shown in FIG. 3, be divided functionally into a processor 1460, a memory store 1461, a master scanner 1462, a central pulse distributor 1463, and a maintenance control center (not shown). Also included, but not shown, in central control 14 is call charging or automatic message accounting facilities to record the charges for various types of telephone station calls. These units are duplicated and provided with interunit parallel transmission cables, commonly referred to as buses, to permit the switching of units to improve the reliability within the system.

Processor 1460 contains most of the logic and control circuitry for stored program control system 46. It controls operation of the system by executing a sequence of instructions stored in memory store 1461. In addition to carrying out arithmetic operations, such as adding and subtracting, processor 1460 can shift, rotate, and perform many logical operations, such as AND/OR, EXCLUSIVE-OR, etc.

Memory store 1461 is an electrically alterable memory having nondestructive readout capabilities. In addition to being used as a permanent storage facility for programs and for translation of data, it is also used for temporarily storing call processing data and for establishing a status record pertaining to call records.

Master scanner 1462 functions to provide processor 1460 with information as to the status and condition of other system units and will not be described in detail herein. The central pulse distributor 1463 is utilized to execute certain processor 1460 output commands. For example, processor 1460 transmits an address to central pulse distributor 1463 which, in turn, transmits enabling pulses from one of the central pulse distributor's outputs over a dedicated bus to translator 1453. Translator 1453 returns vertify pulses over the same designated bus.

The specific details of stored program control system 46 have not been disclosed herein and it will be assumed that any suitable data processing machine can be used in the invention. One example of such a stored program system is disclosed in U.S. Pat. No. 3,570,008 issued Mar. 9, 1971 to R. W. Downing et al.

Translator 1453 is provided to interconnect high speed stored program control system 46 with slower speed signal distributor 8 and scanners 7. Scanners 7 are the input buffers for stored program control system 46 and comprise a ferrod matrix and duplicate controllers. For reliability the ferrod matrix comprises 64 rows of 20 ferrod sensors. The ferrod sensor is a current-sensitive device disclosed in U.S. Pat. No. 3,175,042 issued Mar. 23, 1965 to J. A. Baldwin et al. and is used to monitor scanning leads from various peripheral circuits, such as trunks, line circuits, pulse transmitters and receivers.

Periodically, rows of ferrod sensors in scanner 7 are addressed by stored program control system 46 which, in turn, receives input data and bids for service over scanning leads from the ferrod matrix. A similar scanner, also using ferrod sensors, is disclosed and described in U.S. Pat. No. 3,254,157 issued to A. N. Guercio et al. on May 31, 1966.

Signal distributor 8 provides output buffers for stored program control system 46 and is used to transmit directive information to trunks, pulse transmitters and receivers. Each signal distributor 8 comprises enablecontrol circuits with associated output registers. A parity checking circuit is also provided and each parity circuit can function with up to four signal distributors.

Interposed between stored program system 46 and the peripheral units, such as signal distributor 8 and scanners 7, are translators 1453. Translators 1453 receive high speed information in binary code from processor 1460, make a parity check, and forward translated information over an address bus to scanners 7. In a similar manner, translators 1453 transmit untranslated binary information to the associated output registers of signal distributors 8.

Central pulse distributor 1463, under instructions of processor 1460, selects a particular one of the scanners 7 by transmitting enable signals over buses to the selected scanner units. The enabled scanner 7 scans the aforementioned ferrod sensor matrix looking for service requests generated by the incoming trunks, calling lines, and pulse transmitters and receivers. Upon recognizing a service request, as indicated by the change of state of a ferrod sensor, processor 1460 transfers control from a monitor program to an identification program to identify the circuit requesting service. Having registered the circuit identity, processor 1460 addresses a particular scanner 7 to read binary information from the identified circuit by transmitting binary coded information to translator 1453. The binary coded information input is converted by translator 1453 into the addresses of the particular ferrod sensors monitoring the output leads of the circuit requesting service and is transmitted to selected scanner 7. At this point, the addressed ferrod sensors detect the states of the output leads of the requesting circuit and transmit the data information thereon to processor 1460.

Stored program control system 46 transmits control and data information, via high speed bus and translator 1453, to signal distributor 8 wherein the information is checked for parity and stored in output registers. Processor 1460, in response to program instructions stored in memory store 1461, instructs central pulse distributor 1463 to enable signal distributor 8 to transmit the stored information in the distributor output registers to the identified circuit.

C. Request for Emergency Assistance

Whenever a citizen of a community, for example, Madison, FIGS. 2A and 2B, desired to originate a request for emergency assistance, the citizen removes the handset of his telephone station 631–9970 from the switchhook to initiate a request for dial tone. Scanners 107, scanning the line circuits of telephone central office 1 under the direction of central control 114, detect the off-hook state of line circuit 103 and inform central control 114. Central control 114 ascertains a mismatch of the current scanner reading with the previous scanner reading recorded in memory store and determines that dial tone is required to be supplied to calling telephone station 631–9970.

Referring now to FIG. 4, central control 114 utilizes the line number translator section of memory store 1461 to convert the equipment location of calling line circuit 103 into the directory number assigned the calling telephone station. Each line circuit of telephone central office 1 is assigned a line equipment number identifying the network, frame, bay, concentrator, switch, and level equipment location of line circuit apparatus. When calling line circuit 103 has been identified by line equipment number 15-101-4-31-03, central control 114 enters the head table of the line number translator to obtain the class of service 21 and the directory number 631-9970 assigned the calling telephone station. In addition, the line number translator identifies the type of digit receiver, multifrequency (MF) or dial pulse (DP) that is to be connected to the calling line. Central control 114, FIGS. 2A and 2B, then selects an idle dial pulse digit receiver 113 from information supplied by scanners 107 and directs controller 106 to establish a connection from line facility 31 through line circuit 103, line link LL101, and trunk link TL102 to an appearance of DP digit receiver 113. Signal distributor 108 is then directed by central control 114 to enable DP digit receiver 113 to return dial tone to calling station 631-9970.

Upon receipt of dial tone, the citizen, or calling party, dials the digits of the universal number 911 over line facilities 31 into DP digit receiver 113. Central control 114, through the operation of scanners 107, detects the dialed digits, analyzes the universal number 911, and initiates a route translation request in response thereto. Referring now to FIG. 4, the route translator of telephone central office 1 translates special service codes, such as operator code 211, information code 411, and universal emergency code 911, into route index information that identifies the trunk groups required to complete the call. In addition, the translator, herein a part of memory store 1461, identifies the equipment location of specific trunks within the trunk group, the type of digit pulsing required by the trunk, special instructions to be applied to the operation of the trunk, and, if required, an alternate group of trunks that may be used to complete the call.

D. Translation of Dialed 911 Digits

When dialed universal number digits 911 have been received by DP digit receiver 113, FIG. 2A, central control 114 enters the head table of the route translators of telephone central office 1, FIG. 4, at code 911. The route index information recorded in the route translator notifies central control 114 that trunk group 10 is the first choice required to complete the call and that trunk group 20 is the second choice if the trunks of trunk group 10 are not available. In addition, the trunks of trunk group 10 and trunk group 20 are required to outpulse the seven digits of the calling telephone station directory number previously determined by the line number translator. A subtranslator of the route translator for telephone central office 1 informs central control 114 that the trunks of trunk group 10 are multifrequency (MF) type of trunks that are located on trunk link TL102 and that each trunk requires an MR digit transmitter to outpulse the digits of the calling telephone station directory number.

Central control 114, FIG. 2A, under control of processor 1460 directs scanners 107 to search for an idle MF transmitter and an idle trunk in trunk group 10. Assuming that ANI outgoing trunk 109 and MF transmitter 111 are idle, central control 114 directs controller 106 to set the trunk switches of trunk link TL102 and establish a junctor path between the two. In addition, central control 114 instructs signal distributor 108, via translator 1453, to direct ANI outgoing trunk 109 to transmit a seizure signal on trunk facilities 1293. ANI outgoing trunk 109 is a conventional outgoing trunk of the fundamental type disclosed by H. D. Cahill et al. in U.S. Pat. No. 3,071,650, issued on Jan. 1, 1963. This trunk, when seized, initiates a seizure signal to a distant telephone office. When the distant office is prepared to receive number digits, the trunk enables a transmitter or sender to outpulse the digits of the calling telephone station directory number to the distant office.

E. Receipt of Calling Telephone Station Directory Number

Referring now to FIGS. 2A and 2B, scanners 207 of tandem switching office 2 detect the seizure signal appearing on incoming trunk 203 and request central control 214 to establish a connection with a trunk receiver. Central control 214 determines from memory store 1461 of stored program control 46 that incoming trunk 203 has been assigned trunk class 42 and that all trunks assigned trunk class 42 are arranged to receive MF pulse signals. Accordingly, central control 214 selects idle trunk MF receiver 205 from information supplied by scanners 207 and directs controller 206 to operate the trunk switches of trunk link TL201 and thereby establishes a junctor path between trunk MF receiver 205 and incoming trunk 203. Incoming trunk 203 is then placed in a bypass state by signal distributor 208 and a start pulsing signal is transmitted from tandem switching office 2 over trunk facilities 1293 to telephone central office 1.

When the start pulsing signal is received by telephone central office 1, the central pulse distributor 1463 of stored program control 46 enables MF transmitter 111 to outpulse the number digits 631-9970 assigned the calling telephone station. At the completion of outpulsing, central control 114 directs controller 106 to release MF transmitter 111 and establish a connection between ANI outgoing trunk 109 and line circuit 103 through trunk link TL102 and line link LL101.

F. Translation of Calling Telephone Station Directory Number

Scanners 207 of tandem switching office 2 detect each of the number digits received by trunk MF receiver 205 and thereby enable central control 214 to record digits 631-9970 in an incoming register of memory store 1461. When the last digit has been received, the central control 214 initiates a request for a route translator, FIG. 4, and transfers the calling station number 631–9970 and the trunk class 42 thereto. The route translator enters the head table at code 42-631-9970 and ascertains that the incoming call is to be routed out from tandem switching office 2 over first choice trunk group 20. If the trunks of trunk group 20 are unavailable, the incoming call is to be routed over an operator trunk, such as operator trunk 215, FIG. 2B to telephone operator position 7. In addition, the route index information, FIG. 4 recorded in the route translator informs central control 214 that all seven digits of the calling telephone station directory number are to be outpulsed over the selected trunk. The substranslator identifies the trunks of trunk group 20 as being MF type trunks that are located on trunk link TL202 and that each requires an MF digit transmitter to outpulse the calling telephone station directory number.

G. Interconnection With a Serving 911 Emergency Service Center

Central control 214, FIGS. 2A and 2B, instructs scanners 207 to find an idle outgoing trunk 209 of trunk group 20 and an idle MF transmitter 212. Once located, central control 214 directs controller 206 to operate switches of trunk link TL202 to connect MF transmitter 212 with outgoing trunk 209. In addition, signal distributor 208 is instructed to enable outgoing trunk 209 to transmit a seizure signal over trunk facilities 23. Incoming trunk 301 of Madison 911 emergency service center 3 responds to the seizure signal by enabling logic circuitry 304 to connect MF receiver 303 with incoming trunk 301. When MF receiver 303 is ready to receive number digits, the central pulse distributor 1463 of central control 214 directs MF transmitter 212 to outpulse the calling telephone station directory number digits 631–9970 through outgoing trunk 209 over trunk facilities 23. Receipt of the calling telephone station directory number enables MF receiver 303 to direct logic circuitry 304 to establish a connection between incoming trunk 301 through switch network 300 with attendant position 302. In addition logic circuitry 304 directs call number display 305 to display calling telephone station directory number 631–9970 at attendant position 302. A communication path then extends from calling telephone station 631–9970 over line facilities 31 through serving telephone central office 1 over trunk facilities 1293 through tandem switching office 2 and over trunk facilities 23 to attendant position 302 of Madison 911 emergency service center 3.

In summary, a calling telephone station utilized to dial the universal emergency number 911 is routed from a serving telephone central office to a tandem switching office of the telephone communication switching network. The tandem switching office receives and translates the directory number assigned to the calling telephone station into routing information that is utilized to direct the central control of the tandem switching office to selectively interconnect the calling telephone station with an emergency service center specifically designated to provide emergency assistance for the calling telephone station.

H. Route Translation

In the event the telephone station 856-9972, FIGS. 2A and 2B, dials universal emergency number 911, telephone central office 1, in the aforementioned manner, identifies the calling telephone station and outpulses the assigned directory number 856-9972 over trunk group 10 to tandem switching office 2. Central control 214, via operation of stored program control 46, FIG. 3, enters the calling telephone station directory number 856-9972 and the trunk class 42, identifying the incoming trunks used on the 911 call, into the input of the route translator, FIG. 4, for tandem switching office 2. code 42-856-9972 of the route translator head table instructs central control 214 that trunk group 22 is the first choice of trunks required to complete the call and that the last four digits 9972 of the calling telephone station directory number are to be outpulsed. Trunk group entry 22 in the subtranslator informs central control 214 that the trunks in trunk group 22 are located on trunk link TL202 and that they are dial pulse (DP) trunks that require a DP transmitter to outpulse the last four digits of the calling telephone station directory number. Upon completion of translation of the calling telephone station number, cental control 214, FIGS. 2A and 2B, directs scanners 207 to locate outgoing trunk 211 and DP transmitter 213. Central control 214 then instructs controller 206 to establish a junctor path from DP transmitter 213 through trunk link TL202 to outgoing trunk 211 and, via operation of central pulse distributor 1463, enables DP transmitter 213 to outpulse the digits 9972 over trunk facilities 25 to Norwood 911 emergency service center 5. Incoming trunk 501 of Norwood 911 emergency service center 5 establishes connections to attendant switchboard 502 and DP receiver 503 in order that the last four digits 9972, outpulsed from tandem switching office 2, may be exhibited by calling number display 504 to the attendant answering the call. Thus, when telephone station 856-9972 dials universal emergency number 911, a connection is established over line facilities 51 through serving telephone central office 1 to tandem switching office 2 and over outgoing trunk 211 and trunk facilities 25 to Norwood 911 emergency service center 5. Thereat, the call is answered by an attendant and the last four digits 9972 displayed at attendant switchboard 502.

The route translator of tandem switching office 2, FIG. 4, signifies that trunk group 21 is the first choice trunk group to be assigned to code 42-752-9971 and that no outpulsing is required. Furthermore, the subtranslator identifies the trunks of trunk group 21 as being manual type of trunks that do not require a digit transmitter and are located on trunk link TL202. Thus, when Bethel telephone station 752-9971, FIGS. 2A and 2B, is utilized to originate a 911 emergency assistance call, the calling telephone station directory number 752-9971 is translated by central control 214 into routing information that is utilized by tandem switching office 2 to establish a connection from telephone station 752-9971 to outgoing trunk 210 of trunk group 21. The connection is continued over trunk facilities 26 and incoming trunk 601 to attendant position 602 of Bethel 911 emergency service center 6.

I. Alternate Routing of Emergency Assistance Calls

Each of the trunk groups 20, 21, 22 comprises a plurality of outgoing trunks determined by the number of emergency calls handled by 911 emergency service centers 3, 6, 5. In the event the trunks of a trunk group, for example, trunk group 20, are all busy or otherwise unavailable for connection with an incoming call, the route translator of tandem switching office 2, FIG. 4, enables central control 214 to select an alternate route. The present embodiment of the invention assumes that calls for emergency assistance that cannot be completed to first choice trunks are to be alternate routed to a telephone operator.

Routing information, set forth in the route translator head table, directs central control 214 to alternate route emergency calls to operator trunks. These trunks, as defined by the subtranslator, are manual type of trunks that do not require a digit transmitter and are located on trunk link TL202. When an emergency call cannot be routed to the first choice trunk group, central control 214, FIGS. 2A and 2B, directs scanners 207, via operation of translator 1453, to locate an idle operator trunk on trunk link TL202. Assuming that operator trunk 215 is idle, central control 214 enables controller 206 to establish a connection from the appropriate incoming trunk through trunk links TL201, TL202 to operator trunk 215 and operator position 7. The operator may, if required, extend the call over other facilities of the telephone communication switching network to an emergency service center that is equipped to provide emergency assistance to the calling telephone station.

SUMMARY

It is obvious from the foregoing that the facility, economy, and efficiency of handling emergency assistance calls may be substantially enhanced by the provision of a communication switching network arranged for interconnecting a station dialing a universal number with an emergency service center specifically designated to provide emergency assistance to the calling station. It is further obvious from the foregoing that the aforesaid arrangement of enabling telephone switching offices of the telephone communication switching network to selectively establish call connections from telephone stations dialing universal number 911 to emergency service centers, in accordance with directory numbers assigned the calling telephone stations, obviates the need for the citizens of a metropolitan area to remember the multiplicity of seldom used telephone numbers previously utilized to identify community emergency service centers.

While the equipment of the invention has been disclosed for use in a tandem switching office of the telephone communication switching network, it is to be understood that such an embodiment is intended to be illustrative of the principles of the invention and that numerous other arrangements may be devised by those skilled in the art without departing from the spirit and scope of the invention.

For example, the route translator of the present system could be used with a single telephone central office arranged to serve both the telephone stations and emergency service centers of a number of communities. In this arrangement, the central control of the serving telephone central office identifies the telephone station utilized to dial the universal number 911 and translates the directory number assigned thereto into routing information. The routing information directs the central control of the serving telephone central office to interconnect the calling telephone station with one of the served emergency service centers in accordance with the directory number assigned the calling telephone station. In addition to routing 911 calls to emergency service centers, the apparatus of the invention can be utilized with telephone switching offices to route operator (0), information (411), repair service (611) calls and other types of service calls to the appropriate service locations designated to serve calling telephone stations.

What is claimed is:

1. In a communication system having a plurality of stations each identified by a unique directory number, a plurality of emergency service centers each assigned a universal number and each designated to serve predetermined ones of the stations, means for identifying the unique directory number assigned to each one of the calling stations, means responsive to universal number signals originated by calling ones of the stations for generating directory number signals corresponding to each identified directory number, means for receiving the generated directory number signals over a designated path, means for translating the received directory number signals into routing data identifying ones of the emergency service centers designated to serve the calling stations, and means responsive to the routing data for selectively interconnecting the calling stations with ones of the emergency service centers in accordance with the directory number uniquely assigned each one of the calling stations.

2. In a communication system the invention defined in claim 1 further comprising means for selectively transmitting the generated directory number signals to the identified ones of the emergency service centers.

3. In a communication system having a central controlled switching office serving a plurality of telephone stations each assigned a unique directory number and each connected by a line to the switching office, a plurality of emergency service centers connected by trunks to the switching office wherein each is assigned a universal number and each is designated to serve predetermined ones of the telephone stations, means for generating directory number signals, means for registering the generated directory number signals, means enabled by an offhook state of a calling one of the telephone stations for recording a line equipment number identifying a location within the switching office of the line connected to the calling telephone station, first translator means for translating the recorded line equipment number into the directory number assigned the calling telephone station, second translator means for translating universal number signals originated by the calling telephone station into data instructions identifyng a location of the directory number generating means within the switching office and for identifying digits of the calling telephone station directory number to be generated, control means responsive to said first translator means and said second translator means for enabling said directory number generating means to generate digits of the directory number assigned the calling telephone station, third translator means for translating the digits of the generated directory number signals received by the registering means into routing instructions identifying a location within the switching office of trunks connected to the one emergency service center designated to serve the calling station, and means responsive to said third translator means for connecting the line of the calling telephone station with one of the trunks connected to the designated emergency service center in accordance with the directory number assigned the calling telephone station.

4. In a communication system the invention defined in claim 3 including transmitting means for selectively transmitting ones of the calling telephone station directory number digits identified by the routing instructions over the one trunk to the designated emergency service center.

5. In a communication system the invention defined in claim 4 further including an operator position connected by operator trunks to the switching office, and means for alternatively connecting the line of the calling telephone station with one of the operator trunks when the calling telephone station cannot be interconnected with the designated emergency service center.

6. In a telephone communication switching system having a central controlled tandem switching office terminating incoming trunks from central controlled telephone central offices serving a plurality of telephone stations each assigned a unique directory number and each connected by a line to a serving one of the telephone central offices, a plurality of emergency service centers assigned universal number 911 and each connected by outgoing trunks to the tandem switching office and each designated to serve predetermined ones of the telephone stations, recording means enabled by an off-hook state of a calling one of the telephone stations for recording a line equipment number identifying a location within the serving telephone central office of the line connected to the calling telephone station, first translating means for translating the recorded line equipment number into the directory number assigned the calling telephone station, second translating means for translating universal number signals 911 originated by the calling telephone station into data instructions identifying a location of the incoming trunks within the serving telephone central office and the digits of the calling telephone station directory number to be outpulsed, first generating means responsive to said first translating means and said second translating means for outpulsing over one of the incoming trunks signals corresponding to the calling telephone station directory number, registering means connectable to the one incoming trunk for registering the outpulsed calling telephone station directory number signals, first connecting means for interconnecting the calling telephone station line with the one incoming trunk in accordance with the data instructions, third translating means for translating the registered calling telephone station directory number signals into routing instructions identifying a location within the tandem switching office of ones of the outgoing trunks connected to the one emergency service center specifically designated to serve the calling telephone station, second generating means responsive to said third translator means for selectively outpulsing signals corresponding to the registered calling telephone station directory number over one of the outgoing trunks to the designated serving emergency service center, and means responsive to said third translating means for connecting the one incoming trunk with the one outgoing trunk connected to the designated serving emergency service center in accordance with the routing instructions translated from the calling telephone station directory number.

7. In a telephone communication switching system having a central controlled tandem switching center for interconnecting ones of a plurality of emergency service centers each assigned universal number 911 with ones of a plurality of telephone stations each assigned a unique directory number and each served by a telephone central office coupled by designated trunks to the tandem switching center, means responsive to universal number 911 signals generated by a calling one of the telephone stations for enabling the serving telephone central office to generate and transmit number signals corresponding to the unique directory number assigned the calling telephone station to the tandem switching center over ones of the designated trunks, and means for receiving and translating the transmitted calling telephone station directory number signals into routing information utilized to direct the central control of the tandem switching center to selectively interconnect the calling telephone station with one of the emergency service centers in accordance with the unique directory number assigned the calling telephone station.

8. In a telephone communication switching system the invention defined in claim 7 including means for transmitting the identity of the calling telephone station to the interconnected emergency service center.

9. In a telephone communication switching system having a telephone central office and a plurality of emergency service centers for providing emergency assistance to designated ones of a plurality of telephone stations each assigned a unique directory number and each served by the telephone central office, a tandem switching center for interconnecting calling ones of the telephone stations dialing 911 number signals through the serving telephone central office to ones of the emergency service centers comprising, means for receiving from the serving telephone central office directory number signals corresponding to the directory numbers uniquely assigned each of the calling telephone stations, and means for translating the received calling telephone station directory number signals into routing instructions utilized to direct the tandem switching center to selectively interconnect the calling telephone stations with ones of the emergency service centers in accordance with the individual directory numbers assigned each of the calling telephone stations.

* * * * *